US012505036B1

United States Patent
Kumar N et al.

(10) Patent No.: US 12,505,036 B1
(45) Date of Patent: Dec. 23, 2025

(54) TARGETED ENHANCED POST-WRITE READ

(71) Applicant: Sandisk Technologies, Inc., Milpitas, CA (US)

(72) Inventors: Pradeep Kumar N, Bangalore (IN); Lovish Singla, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/925,222

(22) Filed: Oct. 24, 2024

(51) Int. Cl.
*G06F 12/02* (2006.01)

(52) U.S. Cl.
CPC .................. *G06F 12/0246* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 2016/0092128 A1* | 3/2016 | Jain | G06F 3/0647 |
| | | | 711/103 |
| 2016/0092302 A1* | 3/2016 | Agarwal | G11C 29/52 |
| | | | 714/773 |
| 2016/0094339 A1* | 3/2016 | Agarwal | H04K 1/00 |
| | | | 711/164 |
| 2016/0162357 A1* | 6/2016 | Desireddi | G06F 11/1068 |
| | | | 714/764 |
| 2017/0031612 A1* | 2/2017 | Ravimohan | G06F 3/065 |
| 2022/0171539 A1* | 6/2022 | Ravimohan | G06F 3/0614 |
| 2024/0411688 A1* | 12/2024 | Choudhary | G06F 12/0253 |

* cited by examiner

*Primary Examiner* — Tasnima Matin
(74) *Attorney, Agent, or Firm* — Michael Best & Friedrich LLP

(57) ABSTRACT

Examples include a data storage device controller with one or more electronic processors configured to receive a write command that includes host data to be written to a memory, and service the write command by controlling the memory to write the host data to a primary update block of the memory and a secondary update block of the memory. The one or more electronic processors perform a first targeted enhanced post-write read (EPWR) operation on the primary update block by identifying one or more valid data regions of the primary update block, selectively performing EPWR on the one or more valid data regions of the primary update block, and in response to determining, based on a result of the EPWR performed on the one or more valid data regions, that the one or more valid data regions do not include an uncorrectable error, releasing the secondary update block.

20 Claims, 6 Drawing Sheets

TARGETED ENHANCED POST-WRITE READ

FIELD

This application relates generally to data storage devices and, more particularly, to enhanced post-write read in data storage devices.

SUMMARY

NAND flash devices use several techniques to ensure integrity of stored data. One such technique is enhanced post-write read (EPWR). During operation of a data storage device, host data may be written simultaneously to a primary block and a secondary block in the NAND. After the data is written, or programmed, the data is read back from the primary block to check for data integrity in the NAND. When the data integrity is confirmed, the logical to physical (L2P) mapping, otherwise referred to as the global address table (GAT), and the inverse GAT (IGAT) are updated to point to the primary block associated with the written data. In contrast, when the data read in the EPWR operation does not match the original data that was written during the preceding write operation, the GAT and IGAT entries are updated to point to the secondary block. In this manner, EPWR minimizes a risk of data loss.

EPWR may also be used to identify blocks that have become defective (e.g., due to manufacturing defects or the like) so that the defective blocks can be retired from future use. For example, a block may be identified as defective when the number of read errors (e.g., determined during respective EPWR operations) exceeds a threshold. As a result, the block may be added to a grown bad block (GBB) list. Blocks in the GBB list may be excluded from, for example, metablock formation in the NAND.

Conventionally, EPWR is performed sequentially beginning from the first wordline of a block to the last wordline. This conventional approach fails to take into account the validity of data stored in those wordlines. Rather, EPWR is performed on all wordlines regardless of whether the data is valid or not. However, as host data is written to the NAND, fragments of data in respective wordlines are invalidated and new data is added after the invalidated fragments. Over time, the entirety of a respective wordline may become invalidated, and many wordlines in a block may contain only invalid data. These conventional approaches to EPWR can therefore lead to a drop in performance of the data storage device and negatively impact the block budget because more secondary blocks must be held in the system.

Thus, there is a need for an EPWR method that is targeted based on data validity. One example provides a data storage device controller including a memory; and one or more processors communicatively connected to the memory, the one or more processors configured to: receive a write command from a host device, the write command including host data to be written to the memory, service the write command by controlling the memory to write the host data to a primary update block of the memory and a secondary update block of the memory, perform a first targeted enhanced post-write read (EPWR) operation on the primary update block by identifying one or more valid data regions of the primary update block, selectively performing EPWR on the one or more valid data regions of the primary update block, and in response to determining, based on a result of the EPWR performed on the one or more valid data regions, that the one or more valid data regions do not include an uncorrectable error, releasing the secondary update block, wherein each valid data region of the one or more valid data regions is a data region of a predetermined size in the primary update block that includes at least one fragment of valid data.

In some aspects, the one or more electronic processors are further configured to, in response to determining, based on a result of the EPWR performed on the one or more valid data regions, that the one or more valid data regions include an uncorrectable error, update the L2P table to point to a location of the secondary update block.

In some aspects, each valid data region is a physical page of data, a metapage of data, a string of data, or a wordline of data.

In some aspects, the one or more electronic processors are further configured to in response to performing the first targeted EPWR operation on the primary update block, perform a second targeted EPWR operation on the primary update block by identifying one or more invalid data regions of the primary update block, and selectively performing EPWR on the one or more invalid data regions of the primary update block, wherein each invalid data region of the one or more invalid data regions is a data region of the predetermined size in the primary update block that does not include any valid data.

In some aspects, the one or more electronic processors are further configured to in response to determining, based on a result of the EPWR performed on the one or more invalid data regions of the primary update block, that the one or more invalid data regions include an uncorrectable error, increment a grown bad block (GBB) count based on a detected number of uncorrectable errors in the primary update block, determine whether the GBB count exceeds a threshold, and in response to determining that the GBB count exceeds the threshold, retire the primary update block from metablock formation.

In some aspects, the one or more electronic processors are configured to perform the second targeted EPWR operation on the primary update block as a background process.

In some aspects, the background process is a garbage collection process.

In some aspects, the one or more electronic processors are further configured to, in response to performing the first targeted EPWR operation on the primary update block, add the primary update block to a queue of blocks to perform the second targeted EPWR operation.

In some aspects, the one or more electronic processors are further configured to generate a bitmap for the primary update block, the bitmap including, for each data region of the predetermined size in the primary update block, one bit selectively indicating a validity or invalidity of the data region, and identify the one or more valid data regions of the primary update block based on the bitmap.

In some aspects, the one or more electronic processors are further configured to store the bitmap is stored in a master index page (MIP) associated with the memory.

In some aspects, identifying the one or more valid data regions of the primary update block includes generating a run-length encoding sequence indicating validity or invalidity of each data region of the predetermined size in the primary update block.

Another example provides a method including: receiving a write command from an external electronic device, the write command including host data to be written to a memory; servicing the write command by controlling the memory to write the host data to a primary update block of the memory and a secondary update block of the memory;

performing a first targeted enhanced post-write read (EPWR) operation on the primary update block by identifying one or more valid data regions of the primary update block, selectively performing EPWR on the one or more valid data regions of the primary update block, and, in response to determining, based on a result of the EPWR performed on the one or more valid data regions, that the one or more valid data regions do not include an uncorrectable error, releasing the secondary update block, wherein each valid data region of the one or more valid data regions is a data region of a predetermined size in the primary update block that includes at least one fragment of valid data.

In some aspects, the method further includes in response to determining, based on a result of the EPWR performed on the one or more valid data regions, that the one or more valid data regions include an uncorrectable error, updating the L2P table to point to a location of the secondary update block.

In some aspects, each valid data region is a physical page of data, a metapage of data, a string of data, or a wordline of data.

In some aspects, the method further includes in response to performing the first targeted EPWR operation on the primary update block, performing a second targeted EPWR operation on the primary update block by identifying one or more invalid data regions of the primary update block, and selectively performing EPWR on the one or more invalid data regions of the primary update block, wherein each invalid data region of the one or more invalid data regions is a data region of the predetermined size in the primary update block that does not include any valid data.

In some aspects, the method further includes in response to determining, based on a result of the EPWR performed on the one or more invalid data regions of the primary update block, that the one or more invalid data regions include an uncorrectable error, incrementing a grown bad block (GBB) count based on a detected number of uncorrectable errors in the primary update block, determining whether the GBB count exceeds a threshold, and in response to determining that the GBB count exceeds the threshold, retiring the primary update block from metablock formation.

In some aspects, the second targeted EPWR operation on the primary update block is performed as a background process.

In some aspects, the background process is a garbage collection process.

In some aspects, the method further includes generating a bitmap for the primary update block, the bitmap including, for each data region of the predetermined size in the primary update block, one bit selectively indicating a validity or invalidity of the data region, wherein the one or more valid data regions of the primary update block are identified based on the bitmap.

Another example provides a data storage device including: memory means; and processing means communicatively connected to the memory means, the processing means configured to: receive a write command from a host device, the write command including host data to be written to the memory means, service the write command by controlling the memory means to write the host data to a primary update block of the memory means and a secondary update block of the memory means, perform a first targeted enhanced post-write read (EPWR) operation on the primary update block by: identifying one or more valid data regions of the primary update block, selectively performing EPWR on the one or more valid data regions of the primary update block, and in response to determining, based on a result of the EPWR performed on the one or more valid data regions, that the one or more valid data regions do not include an uncorrectable error, releasing the secondary update block, wherein each valid data region of the one or more valid data regions is a data region of a predetermined size in the primary update block that includes at least one fragment of valid data.

Other aspects of the invention will become apparent by consideration of the detailed description and accompanying drawings.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the data storage controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein may be applicable to other types of solid-state memory, such as NOR, PCM ("Phase Change Memory"), ReRAM, MRAM, etc.

Figure 1:
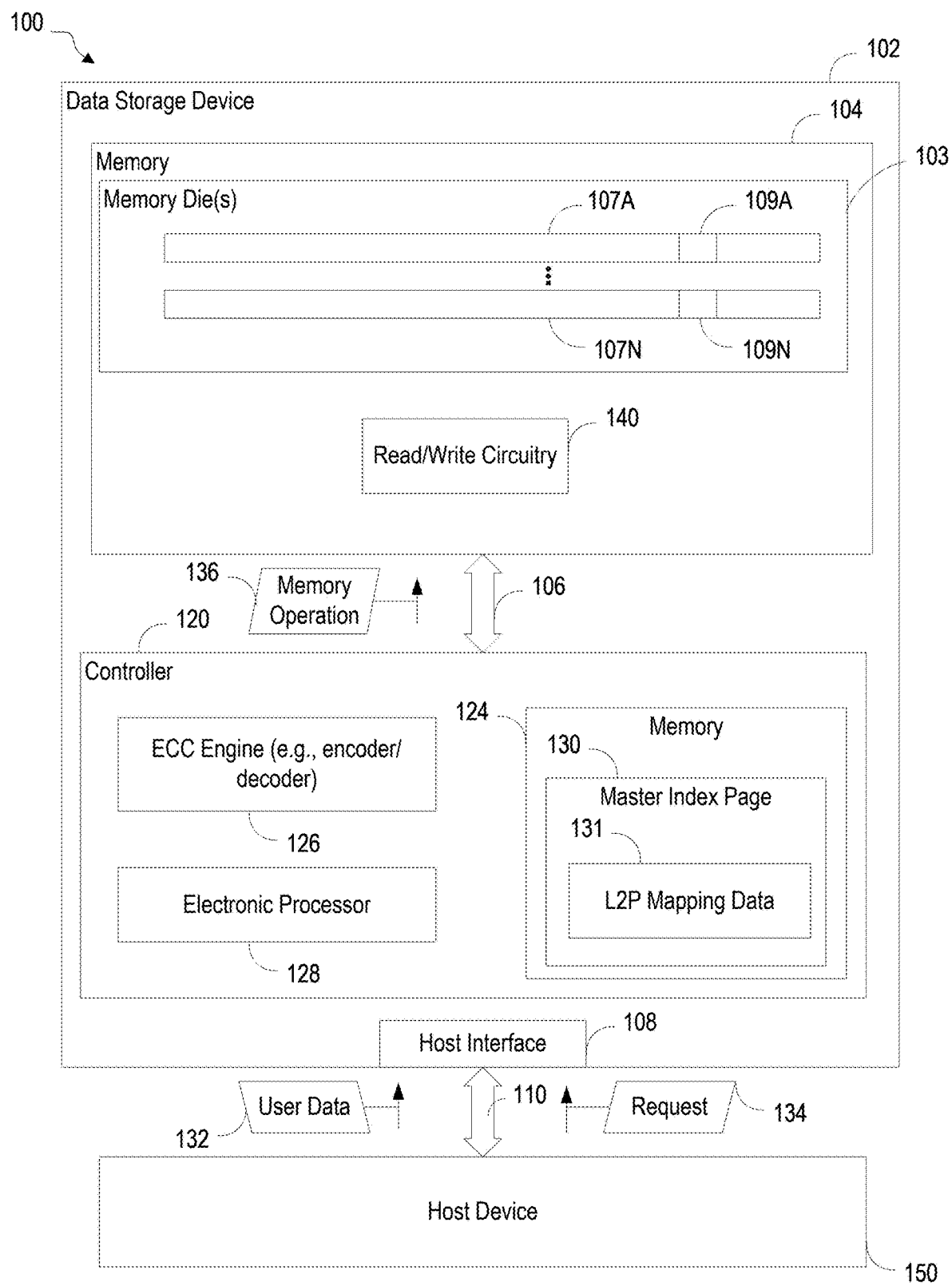
FIG. 1 is a block diagram illustrating a system including a data storage device and a host device, according to some examples.

FIG. 1 is a block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage device controller") and a memory 104 (e.g., non-volatile memory) that is coupled to the data storage device controller 120.

One example of the structural and functional features provided by the data storage device controller 120 are illustrated in FIG. 1 in a simplified form. The data storage device controller 120 may also include additional modules or components other than those specifically illustrated in FIG. 1. Additionally, although the data storage device 102 is illustrated in FIG. 1 as including the data storage device controller 120, in other implementations, the data storage device controller 120 is instead located separate from the data storage device 102. As a result, operations that would normally be performed by the data storage device controller 120 described herein may be performed by another device that connects to the data storage device 102.

The data storage device 102 and the host device 150 may be operationally coupled by means of a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid-state drive (SSD), which may be used as an embedded storage drive (e.g., a mobile embedded storage drive), an enterprise storage drive (ESD), a client storage device, a cloud storage drive, or other suitable storage drive.

The data storage device 102 may be configured to be coupled to the host device 150 by means of the communication path 110, such as a wired communication path and/or a wireless communication path. For example, the data storage device 102 may include an interface 108 (e.g., a host interface) that enables communication using the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests to erase data at, read data from, or write data to the memory 104 of the data storage device 102. Additionally, the host device 150 may issue one or more vendor specific commands to the data storage device 102 to notify and/or configure the data storage device 102. For example, the host device 150 may be configured to provide data, such as user data 132, to be stored at the memory 104, or to request data, by request 134, to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates with a memory interface that enables reading from the memory 104 and writing to the memory 104. In some examples, the host device 150 may operate in compliance with an industry specification, a Secure Digital (SD) Host Controller specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. A set of dies of the memory 104 may be logically grouped as a metaplane. A metablock may include a group of multiple blocks that are located in memory dies of the same metaplane that are processed together as if they were a single large block. For example, the metaplane may include two memory dies. In other implementations, a metaplane may include more than two dies.

Each die 103 may include one or more planes, which in turn include one or more blocks. Each block may include one or more groups of storage elements, such as a representative group of storage elements 107A-107N. The group of storage elements 107A-107N may be configured as a wordline. The group of storage elements 107 may include multiple storage elements, such as a representative storage elements 109A and 109N, respectively. These storage elements 107A-107N may otherwise be referred to herein as fragments 107A-107N. In some instances, each fragment corresponds to a physical page of data. In some instances, each fragment has a data width of eight sectors. Data from the host may be written to one or more metablocks. A metablock may be selected from the one or more blocks spanning across multiple planes. The pages of the one or more blocks may be grouped together and referred to as a metapage.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies. For example, the read/write circuitry 140 may be configured to perform various read/write operations such as initial writing to volatile memory, array commit functions, and other functions as required for a given application.

The data storage device 102 includes the data storage device controller 120 coupled to the memory 104 (e.g., the one or more memory dies 103) using a bus 106, an interface (e.g., interface circuitry), another structure, or a combination thereof. For example, the bus 106 may include multiple distinct channels to enable the data storage device controller 120 to communicate with each of the one or more memory dies 103 in parallel with, and independently of, communication with the other memory dies 103. In some implementations, the memory 104 may be a flash memory.

The data storage device controller 120 is configured to receive data and instructions from the host device 150 and to send data to the host device 150 according to host commands received from the host device 150. For example, the data storage device controller 120 may send data to the host device 150 using the interface 108, and the data storage device controller 120 may receive data from the host device 150 using the interface 108. The data storage device controller 120 is configured to send data and commands (e.g., the memory operation 136) to the memory 104 and to receive data from the memory 104. For example, the data storage device controller 120 is configured to send data and a write command to cause the memory 104 to store data (e.g., host data) to a specified address of the memory 104.

The write command may specify a physical address of a portion of the memory 104 (e.g., a physical address of a wordline of the memory 104) that is to store the data.

The data storage device controller 120 is configured to send a read command to the memory 104 to access data from a specified address of the memory 104. The read command may specify the physical address of a region of the memory 104 (e.g., a physical address of a wordline of the memory 104). The data storage device controller 120 may also be configured to send data and commands to the memory 104 associated with background scanning operations, garbage collection operations, and/or wear-leveling operations, or other suitable memory operations.

The data storage device controller 120 may include at least one memory 124 (for example, at least one random access memory ("RAM"), at least one read-only memory ("ROM"), at least one non-transitory computer readable medium, or a combination thereof), an error correction code (ECC) engine 126, and one or more electronic processors 128 (for example, a microprocessor, a microcontroller, a field-programmable gate array ("FPGA") semiconductor, an application specific integrated circuit ("ASIC"), or another suitable programmable device). Although only one processor 128 is shown in FIG. 1 and the following description is in terms of one processor 128, it will be understood by those of skill in the art that multiple processors may perform the processes described. The memory 124 stores data and/or instructions that may be executable by the electronic processor 128 for performing, among other things, the operations and methods described herein. For example, the memory 124 may store a master index page (MIP) 130 that includes, among other things, L2P mapping information 131.

Additionally, although the data storage device controller 120 is illustrated in FIG. 1 as including the at least one memory 124, in other implementations, some or all of the at least one memory 124 is instead located separate from the data storage device controller 120 and executable by the electronic processor 128 or a different electronic processor that is external to the data storage device controller 120 and/or the data storage device 102. For example, the at least one memory 124 may include dynamic random-access memory (DRAM) that is separate and distinct from the data storage device controller 120. As a result, operations that would normally be performed solely by the data storage device controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage device controller 120 and in communication with memory of the data storage device 102, and 4) a different electronic processor that is external to the data storage device controller 120 and in communication with memory that is external to the data storage device 102.

The device controller 120 maintains an L2P table that maps logical addresses used by the host device 150 to physical addresses used by the memory 104. The L2P table is also referred to herein as a group allocation table (GAT). Each GAT entry may contain mapping information for a predetermined number of sectors that map to one or more physical addresses in the memory 104. The GAT and the IGAT are included as part of the L2P mapping data 131 in the MIP 130.

Figure 2:
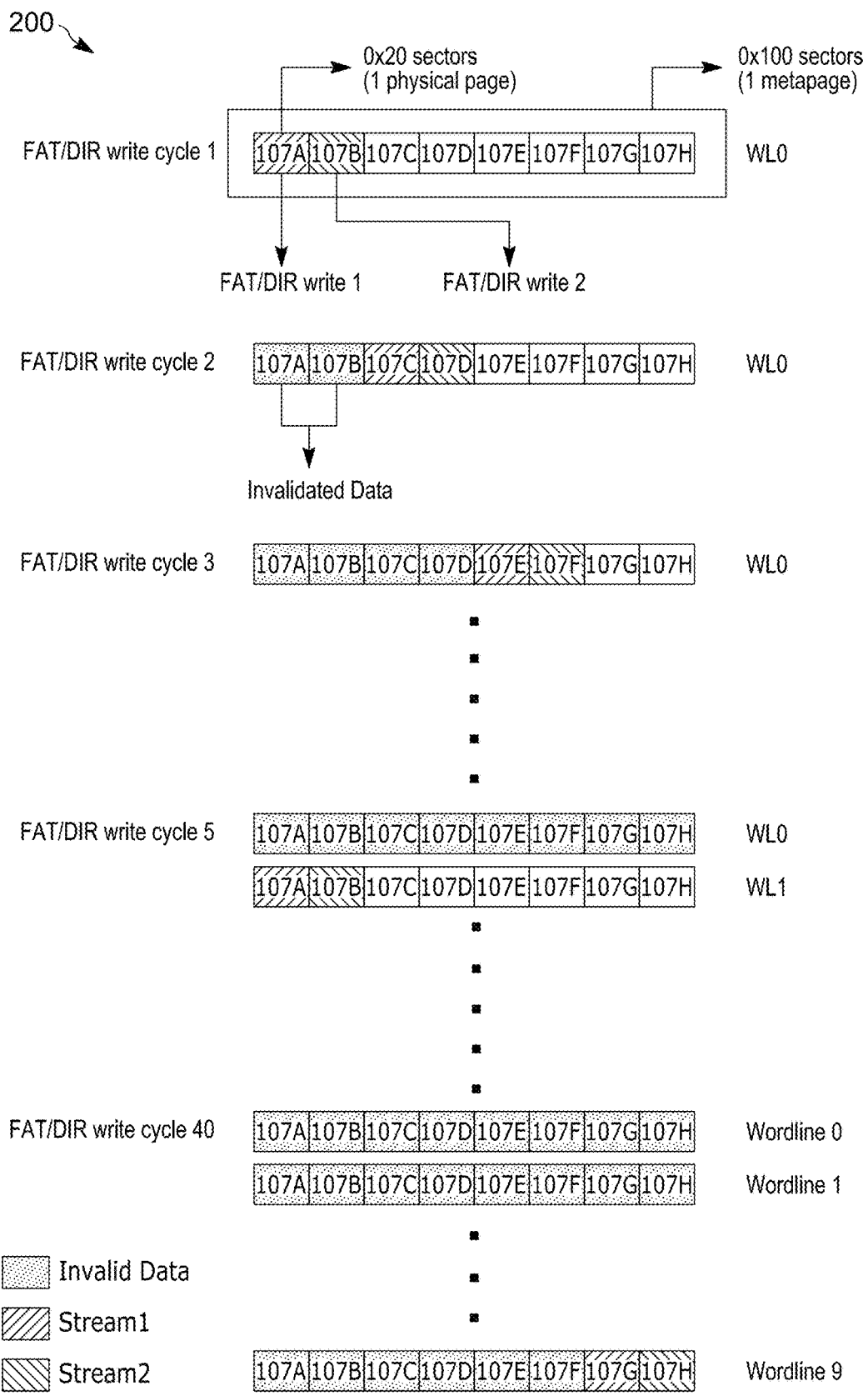
FIG. 2 is a diagram illustrating an example write process for two streams of random data, according to some examples.

FIG. 2 is a diagram illustrating an example write process 200 for parallel two streams of data (e.g., a first data stream stream1 and a second data stream stream2) repeatedly written to a metablock over a plurality of write cycles and respectively corresponding to two different logical block address (LBA) ranges. In the illustrated example, the two streams of data (stream1 and stream2) are primarily random data. For example, the two streams of data may be file allocation table (FAT) and directory (DIR) write data repeatedly written to the same metablock.

As the device controller 120 receives write commands from the host device 150 over the plurality of write cycles, the device controller 120 invalidates older data in the metablock to write new FAT and DIR data. For example, in a first write cycle, the device controller 120 writes the data stream1 to a first storage element 107A of a first wordline WL0 and writes the data stream2 to a second storage element 107B of the first wordline WL0. In a second write cycle, the device controller 120 invalidates the data stream1 in the first storage element 107A and the data stream2 in the second storage element 107B of the first wordline WL0 and writes newly received host data of the data stream1 and the data stream2 to a third storage element 107C and a fourth storage element 107D of the first wordline W0, respectively.

In the third write cycle, the device controller 120 invalidates the data stream1 in the third storage element 107C and the data stream 2 in the fourth storage element 107D of the first wordline WL0, and writes newly received host data of the data stream1 and the data stream2 to the fifth storage element 107E and sixth storage element 107F of the first wordline WL0, respectively.

Figure 3:
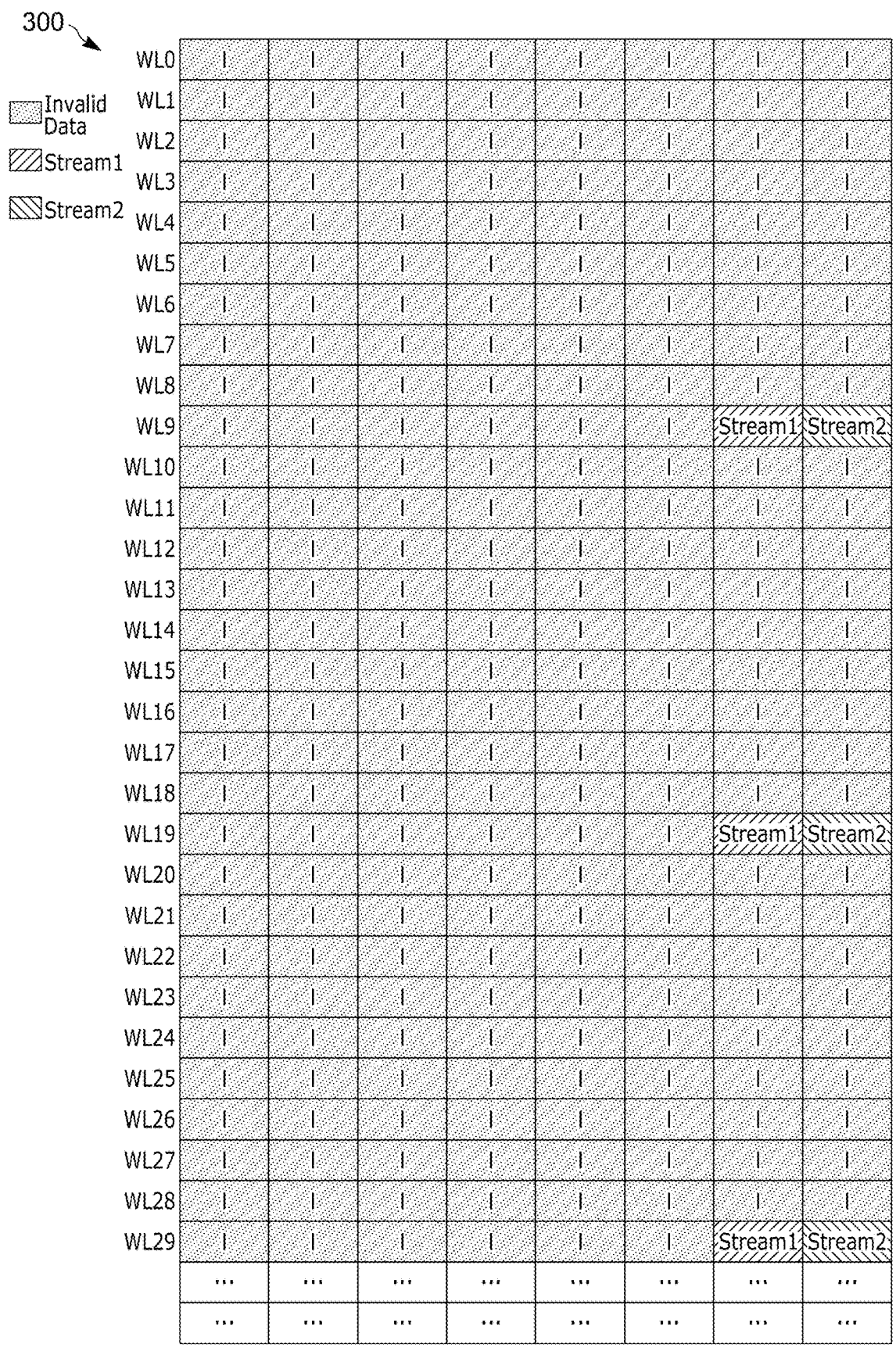
FIG. 3 is a diagram illustrating a valid fragment distribution for a closed metablock, according to some examples.

The device controller 120 repeats the process of invalidating and writing data for each storage element 107 of the first wordline W0. In response to each storage element of the first wordline W0 being invalidated (e.g., at the fifth write cycle illustrated in FIG. 2), the device controller 120 writes subsequently received host data from the data stream1 and the data stream2 to first and second storage elements 107A and 107B of the second wordline WL1, respectively. The device controller 120 similarly invalidates and writes to respective storage elements in the second wordline WL1 over a plurality of write cycles until each storage element in the second wordline WL1 is invalidated, and repeats this process with respect to subsequent wordlines. FIG. 3 is a diagram illustrating an example valid fragment distribution of a closed metablock 300 after, for example, 120 write cycles of the two data streams (stream1 and stream2) to the metablock 300 with the LBA range changing after every fortieth write.

As illustrated in FIG. 3, after many write cycles of random host data (e.g., FAT and DIR write data), the majority of the wordlines in the metablock 300 are invalid (e.g., having no valid fragments). As described above, current methods of enhanced post-write read (EPWR) do not take into account wordline validity. Therefore, when performing a conventional EPWR operation, the device controller 120 reads back each of the invalid wordlines of a metablock. Until EPWR is completed for each wordline, both the primary data and the secondary data (e.g., the garbage collection source block) associated with host data are held (e.g., not released for future host writes) in the NAND.

Blocks storing secondary data are often, though not limited to, single level cell (SLC) blocks, which may have a limited supply in the NAND. Therefore, it is important that these SLC blocks be released efficiently so that host data can continue to be written to the SLC blocks. If the memory 104 runs out of available SLC blocks, the data storage device 102 may experience a dip in performance as the device controller 120 performs a corrective action to recover secondary data blocks.

Figure 4:
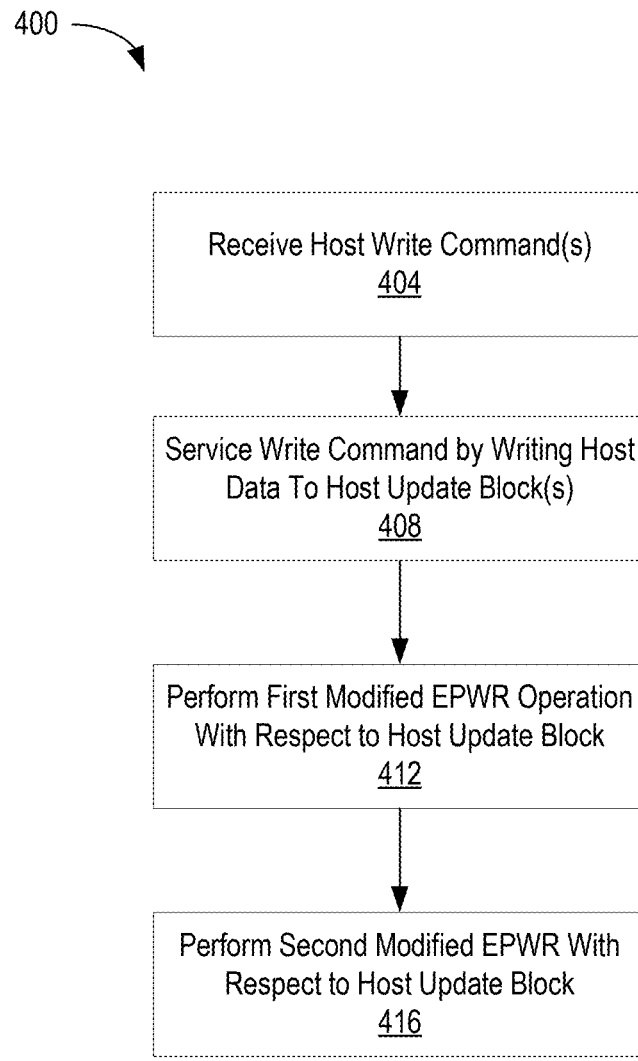
FIG. 4 is a flowchart illustrating a method for performing targeted enhanced post-write read, according to some examples.

Therefore, FIG. 4 illustrates a method 400 for performing targeted EPWR on a metablock. The method 400 includes receiving, with the device controller 120, a host write command including host data (e.g., user data) to be written to the memory 104 (at block 404).

The device controller 120 services the write command by writing the host data to a designated host update block in the memory 104 (at block 408). The host update block is, for example, a metablock of the memory 104 selected by the device controller 120 for writing host data. For example, the device controller 120 writes the host data to one or more available wordlines (e.g., one or more next available fragments of the one or more next available wordlines) in the host update block. In some instances, writing the host data to the next available fragment or fragments includes invalidating one or more previous fragments of the wordline. The host update block may otherwise be referred to herein as a primary update block.

In some instances, servicing the write command with the device controller 120 also includes writing the host data or control data associated with the host data (e.g., mapping data) to a control update block, or secondary update block. In some instances, the secondary update block is a garbage collection source block. By programming both a primary update block and a secondary update block, the device controller 120 implements a fail-safe for retrieving host data in the event of a write failure or defect of the primary update block. For example, when corruption is detected in the primary update block, LBAs from the corrupted regions may be replaced with the secondary update block.

Figure 5:
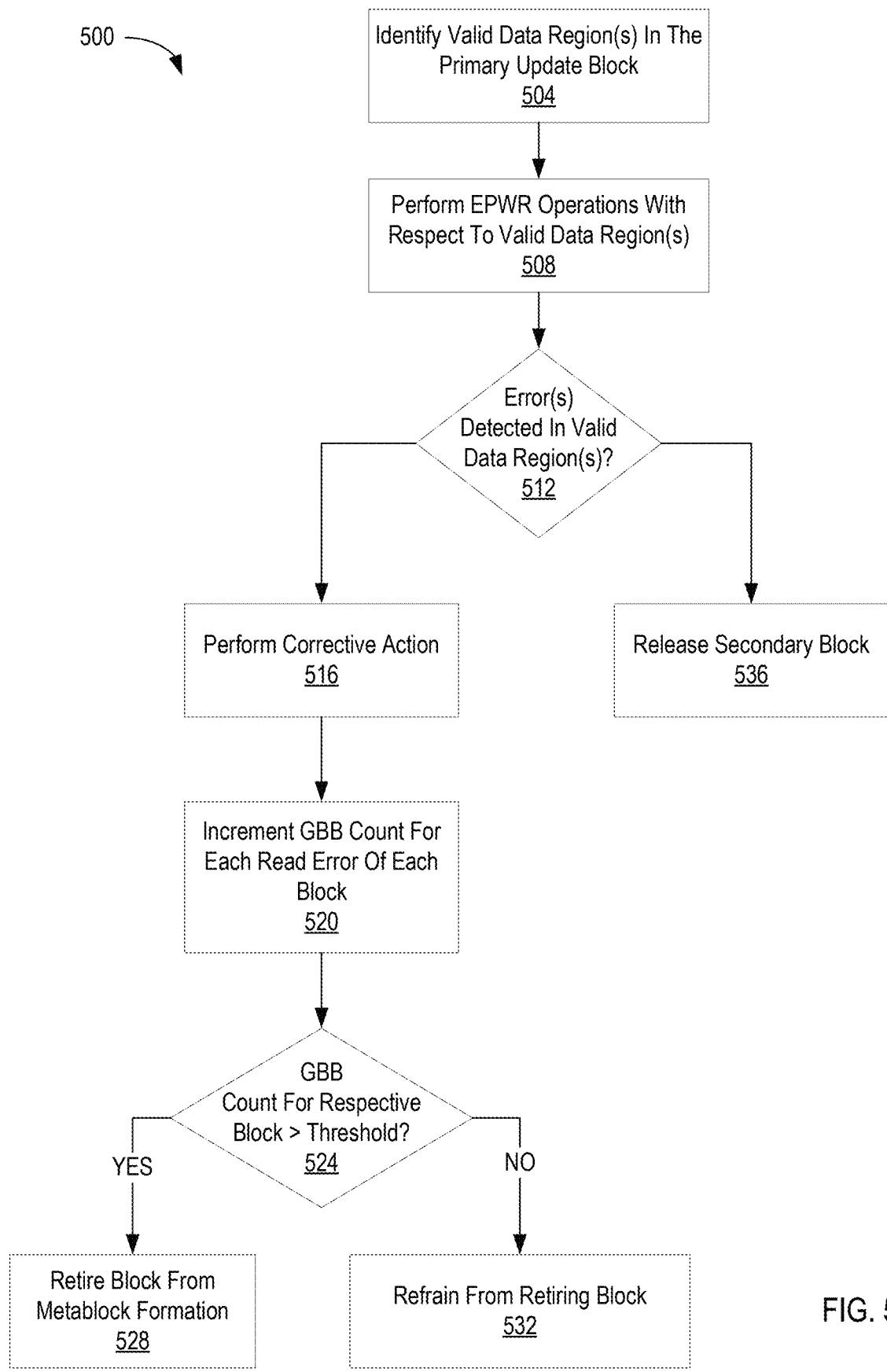
FIG. 5 is a flowchart illustrating a method for preforming enhanced post-write read that is targeted to valid data regions of a block, according to some examples.

Accordingly, the method 400 includes performing a first targeted EPWR operation with respect to the primary update block (at block 412). The device controller 120 may perform the first targeted EPWR operation in response to servicing the write command, according to a periodic interval, or in response to another trigger condition. In some instances, the device controller 120 adds the primary update block to a queue of metablocks, and performs the first targeted EPWR operation on the metablocks in the queue. FIG. 5 illustrates an example method 500 for performing, with the device controller 120, the first targeted EPWR operation with respect to the primary update block.

As described above, traditional EPWR operations do not take into account validity of data in the primary update block, which can delay the release of secondary update blocks and reduce performance of the memory device. Additionally, as described above, wordlines having random data (e.g., data from FAT and DIR writes) have a high chance of containing invalid data. Therefore, the first targeted EPWR operation is an EPWR operation that is targeted toward regions of the primary update block having valid data. The first targeted EPWR operation may otherwise be referred to as the valid fragment count (VFC) based EPWR operation.

The method 500 includes identifying, with the device controller 120, one or more valid data regions in the primary update block (at block 504). As used herein, a valid data region is a region of a predetermined size in the primary update block that has at least one fragment of valid data. For example, each valid data region may consist of a fragment of data, a physical page of data, a string of data, a metapage of data, or a wordline of data.

For simplicity, the valid data regions are described herein at the wordline level. For example, each valid data region may be a wordline in the primary update block that has at least one fragment of valid data. For example, the device controller 120 may determine that a wordline (e.g., the first wordline WL0 illustrated in FIG. 3) having eight fragments of invalid data and zero fragments of valid data is an invalid wordline. In contrast, the device controller 120 may determine that another wordline (e.g., the tenth wordline WL9 illustrated in FIG. 3) having six fragments of invalid data and two fragments of valid data is a valid wordline. In some instances, the device controller 120 determines validity of data in each data region (e.g., each wordline) by referencing IGAT entries for the respective wordlines in the primary update block.

In some instances, identifying the valid data regions of the metablock (at block 504) includes generating and/or updating a bitmap of the validity of each wordline in the metablock. The bitmap may be stored in, for example, the MIP 130 associated with the memory 104. In some instances, the device controller 120 generates and stores a respective bitmap for each metablock in in the queue for performing VFC-based EPWR.

The bitmap indicates which wordlines of a metablock contain valid data. For a given metablock, the bitmap may contain one bit indicating the validity of each wordline in the given metablock. For example, a 0 may indicate that a wordline is invalid and a 1 may indicate that a wordline is valid. The number of bytes required in the MIP 130 for storing a respective bitmap is therefore based on the number of wordlines in a metablock. For example, the number of bytes required in the MIP 130 for storing a respective bitmap may be equal to: ceil (<No. of wordlines in metablock>/8). However, in some instances, the device controller 120 generates and stores a reduced bitmap that identifies only the wordlines having valid data.

As described above, the valid data regions identified by the device controller 120 are not limited to wordlines. Therefore, the bitmap generated by the device controller 120 may track the valid data regions of the metablock at the fragment level, physical page level, string level, the metapage level rather than at the wordline level, or any other suitable level. For example, the bitmap may contain one bit for each fragment of the metablock, one bit for each physical page of the metablock, one bit for each string of the metablock, or one bit for each metapage of the metablock.

In some instances, to reduce the number of additional bytes needed to store bitmaps in the MIP 130, the device controller 120 uses run-length encoding to track wordline validity of each metablock rather than generating and storing bitmaps. For example, in reference to the example metablock 300 of FIG. 3, the device controller 120 may store the encoding sequence of 9I 1V 9I 1V 9I 1V to indicate that wordlines WL0-WL8 are invalid, wordline WL9 is valid, wordlines WL10-W18 are invalid, wordline WL19 is valid, wordlines WL20-WL28 are invalid, and wordline WL29 is valid. The encoding sequence of 9I 1V 9I 1V 9I 1V simply indicates that nine invalid wordlines are followed by a valid wordline, a second set of nine invalid wordlines after the valid wordline is followed by a second valid wordline, and a third set of nine invalid wordlines after the second valid wordline is followed by a third valid wordline.

In response to identifying the valid data regions of the primary update block, the device controller 120 selectively performs respective EPWR operations on the valid data regions (e.g., the valid wordlines) to determine whether read errors exist in the valid data regions (at block 508). During the VFC-based EPWR operation, the device controller 120 does not perform EPWR on any invalid wordlines of the primary update block. The device controller 120 therefore determines whether an error (e.g., one or more errors) is detected in the valid data regions (at decision block 512).

In response to determining that an error (e.g., at least one uncorrectable error) is included in a valid data region ("YES" at decision block 512), the device controller 120 performs a corrective action to commit LBAs of the failed regions using the secondary update block (at block 516). For example, in response to the detecting the uncorrectable error, the device controller 120 creates GAT and IGAT entries for the host data based on the secondary block wordlines.

In some instances, in response to errors being detected in the primary update block, the device controller 120 increments a respective grown bad block (GBB) count for each read error detected for a respective block (e.g., a respective physical block of the metablock) (at block 520), and determines whether the respective GBB count for each respective block exceeds a threshold (at decision block 524). In response to the GBB count for a respective block exceeding the threshold ("YES" at decision block 524), the device controller 120 retires the respective block from metablock formation (at block 528). In response to determining that the GBB count for the respective block does not exceed the threshold ("NO" at decision block 524), the device controller 120 refrains from retiring the respective block from metablock formation (at block 531).

In response to determining that that there is no error included in the valid data region ("NO" at decision block 512), the device controller 120 updates the GAT and IGAT to point to the primary update block address and releases the secondary update block associated with the primary update block (at block 536). Therefore, by performing the VFC-based EPWR operation of the method 500, the device controller 120 is able to more efficiently release secondary blocks for future use, thus improving operation of the data storage device 102. Additionally, because the secondary blocks are released more efficiently, the device controller 120 is able to reserve fewer backup blocks (e.g., fewer backup SLC blocks).

As described above, EPWR is used for detecting both write errors and physical defects (e.g., wordline shorts) in the blocks of the memory 104. Therefore, EPWR should not be entirely skipped for a given wordline even when no valid data is present in the wordline. For example, an invalid wordline may be used in the future to store valid data. Therefore, referring back to FIG. 4, in response to performing the first targeted EPWR operation with respect to the primary update block (at block 412), the device controller 120 also performs a second targeted EPWR operation with respect to the invalid wordlines of the primary update block (at block 416).

Figure 6:
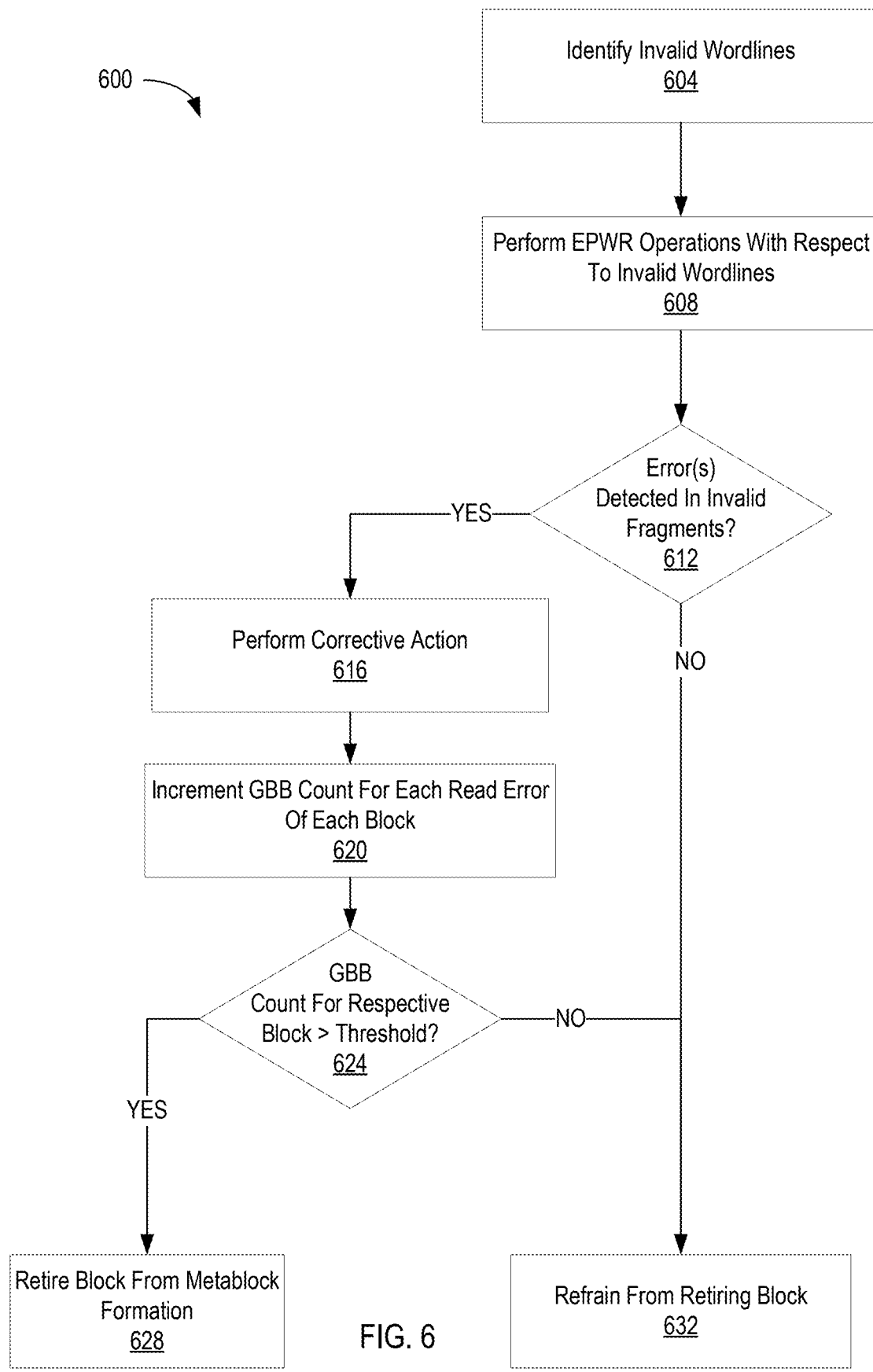
FIG. 6 is a flowchart illustrating a method for performing enhanced post-write read that is targeted to invalid data regions of a block, according to some examples.

In some instances, the second targeted EPWR operation, otherwise referred to herein as a grown bad block (GBB) identification EPWR, is performed as a background process during garbage collection. For example, in response to completion of the VFC-based EPWR operation, the device controller 120 may add the primary update block of the method 400 to a queue of blocks for later performing GBB identification EPWR. FIG. 6 illustrates an example method 600 for performing the second targeted EPWR operation with respect to a metablock (e.g., the primary update block).

The method 600 includes identifying, with the device controller 120, invalid data regions (e.g., invalid wordlines) in the primary update block (at block 604). In some instances, the device controller 120 determines invalidity of wordlines in the primary update block using the bitmap generated at block 504 of the method 500. Therefore, the device controller 120 may store, in the memory 124, the bitmap generated during the VFC-based EPWR at least until completion of GBB identification EPWR.

As a result of being performed as a background process, the queue for performing GBB identification EPWR may include more metablocks than the VFC-based EPWR, and the GBB identification EPWR may be performed slower than the VFC-based EPWR. Therefore, the number of bitmaps maintained by the device controller 120 during GBB identification EPWR may be dependent on the number of metablocks in the GBB identification EPWR queue. Therefore, the number of additional bytes required in the MIP 130 for using bitmaps during GBB identification EPWR is based on the number of wordlines in each metablock of the memory 104 and the number of metablocks in the GBB identification EPWR queue. For example, the number of additional bytes required may be equal to: ceil (<No. of wordlines in metablock>/8)*<Queue depth of the GBB identification EPWR queue>. However, in some instances, the device controller 120 relies on run-length encoding sequences to identify invalid data regions rather than bitmaps.

In response to identifying the invalid data regions of the primary update block (at block 604), the device controller 120 selectively performs respective EPWR operations on the invalid data regions (e.g., the valid wordlines) to determine whether read errors exist in the valid data regions (at block 608). During the GBB identification EPWR operation, the device controller 120 does not perform EPWR on any valid wordlines of the primary update block, as VFC-based EPWR is performed on these wordlines at block 412 of the method 400. The device controller 120 therefore determines whether an error (e.g., one or more errors) is detected in the invalid data regions (at decision block 612).

In response to determining that an error (e.g., at least one uncorrectable error) is included in an invalid data region ("YES" at decision block 612), the device controller 120 may perform a corrective action on the invalid data region having the error (at block 616). In response to errors being detected in the primary update block, the device controller 120 increments the respective GBB count for each read error detected for each respective block (e.g., a respective physical block of the metablock) (at block 620), and determines whether the respective GBB count for each respective block exceeds a threshold (at decision block 624). In response to the GBB count for a respective block exceeding the threshold ("YES" at decision block 624), the device controller 120 retires the respective block from metablock formation (at block 628). For example, the device controller 120 may add the block to a GBB list indicative of physical blocks that should no longer be used in metablock formation. Retiring the block from metablock formation may include replacing the retired block with a spare block.

In response to determining that the GBB count for the respective block does not exceed the threshold ("NO" at decision block 624), the device controller 120 refrains from retiring the respective block from metablock formation (at block 632).

In response to determining that the invalid data regions do not include uncorrectable errors ("NO" at decision block 612), the device controller 120 similarly refrains from retiring the respective block from metablock formation (at block 632).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot store information to blocks of a solid state drive, among other features and functions set forth herein).

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data storage device controller, comprising:
a memory; and
one or more processors communicatively connected to the memory, the one or more processors configured to:
 receive a write command from a host device, the write command including host data to be written to the memory,
 service the write command by controlling the memory to write the host data to a primary update block of the memory and a secondary update block of the memory,
 perform a first targeted enhanced post-write read (EPWR) operation on the primary update block by:
  identifying one or more valid data regions of the primary update block,
  selectively performing EPWR on the one or more valid data regions of the primary update block, and
  in response to determining, based on a result of the EPWR performed on the one or more valid data regions, that the one or more valid data regions do not include an uncorrectable error, releasing the secondary update block,
  wherein each valid data region of the one or more valid data regions is a data region of a predetermined size in the primary update block that includes at least one fragment of valid data.

2. The data storage device controller of claim 1, wherein the one or more processors are further configured to, in response to determining, based on a result of the EPWR performed on the one or more valid data regions, that the one or more valid data regions include an uncorrectable error, update the L2P table to point to a location of the secondary update block.

3. The data storage device controller of claim 1, wherein each valid data region is a physical page of data, a metapage of data, a string of data, or a wordline of data.

4. The data storage device controller of claim 1, wherein the one or more processors are further configured to:
 in response to performing the first targeted EPWR operation on the primary update block, perform a second targeted EPWR operation on the primary update block by
  identifying one or more invalid data regions of the primary update block, and
  selectively performing EPWR on the one or more invalid data regions of the primary update block,
 wherein each invalid data region of the one or more invalid data regions is a data region of the predetermined size in the primary update block that does not include any valid data.

5. The data storage device controller of claim 4, wherein the one or more processors are further configured to:
 in response to determining, based on a result of the EPWR performed on the one or more invalid data regions of the primary update block, that the one or more invalid data regions include an uncorrectable error, increment a grown bad block (GBB) count based on a detected number of uncorrectable errors in the primary update block,
 determine whether the GBB count exceeds a threshold, and
 in response to determining that the GBB count exceeds the threshold, retire the primary update block from metablock formation.

6. The data storage device controller of claim 4, wherein the one or more processors are configured to perform the second targeted EPWR operation on the primary update block as a background process.

7. The data storage device controller of claim 6, wherein the background process is a garbage collection process.

8. The data storage device controller of claim 4, wherein the one or more processors are further configured to, in response to performing the first targeted EPWR operation on the primary update block, add the primary update block to a queue of blocks to perform the second targeted EPWR operation.

9. The data storage device controller of claim 1, wherein the one or more processors are further configured to:
 generate a bitmap for the primary update block, the bitmap including, for each data region of the predetermined size in the primary update block, one bit selectively indicating a validity or invalidity of the data region, and
 identify the one or more valid data regions of the primary update block based on the bitmap.

10. The data storage device controller of claim 9, wherein the one or more processors are further configured to store the bitmap is stored in a master index page (MIP) associated with the memory.

11. The data storage device controller of claim 1, wherein identifying the one or more valid data regions of the primary update block includes generating a run-length encoding sequence indicating validity or invalidity of each data region of the predetermined size in the primary update block.

12. A method, comprising:
 receiving a write command from an external electronic device, the write command including host data to be written to a memory;
 servicing the write command by controlling the memory to write the host data to a primary update block of the memory and a secondary update block of the memory;
 performing a first targeted enhanced post-write read (EPWR) operation on the primary update block by
  identifying one or more valid data regions of the primary update block,
  selectively performing EPWR on the one or more valid data regions of the primary update block, and
  in response to determining, based on a result of the EPWR performed on the one or more valid data regions, that the one or more valid data regions do not include an uncorrectable error, releasing the secondary update block, wherein each valid data region of the one or more valid data regions is a data region of a predetermined size in the primary update block that includes at least one fragment of valid data.

13. The method of claim 12, further comprising:
in response to determining, based on a result of the EPWR performed on the one or more valid data regions, that the one or more valid data regions include an uncorrectable error, updating the L2P table to point to a location of the secondary update block.

14. The method of claim 12, wherein each valid data region is a physical page of data, a metapage of data, a string of data, or a wordline of data.

15. The method of claim 12, further comprising:
in response to performing the first targeted EPWR operation on the primary update block, performing a second targeted EPWR operation on the primary update block by
identifying one or more invalid data regions of the primary update block, and
selectively performing EPWR on the one or more invalid data regions of the primary update block,
wherein each invalid data region of the one or more invalid data regions is a data region of the predetermined size in the primary update block that does not include any valid data.

16. The method of claim 15, further comprising:
in response to determining, based on a result of the EPWR performed on the one or more invalid data regions of the primary update block, that the one or more invalid data regions include an uncorrectable error, incrementing a grown bad block (GBB) count based on a detected number of uncorrectable errors in the primary update block,
determining whether the GBB count exceeds a threshold, and
in response to determining that the GBB count exceeds the threshold, retiring the primary update block from metablock formation.

17. The method of claim 15, the second targeted EPWR operation on the primary update block is performed as a background process.

18. The method of claim 17, wherein the background process is a garbage collection process.

19. The method of claim 12, further comprising:
generating a bitmap for the primary update block, the bitmap including, for each data region of the predetermined size in the primary update block, one bit selectively indicating a validity or invalidity of the data region,
wherein the one or more valid data regions of the primary update block are identified based on the bitmap.

20. A data storage device, comprising:
memory means; and
processing means communicatively connected to the memory means, the processing means configured to:
receive a write command from a host device, the write command including host data to be written to the memory means,
service the write command by controlling the memory means to write the host data to a primary update block of the memory means and a secondary update block of the memory means,
perform a first targeted enhanced post-write read (EPWR) operation on the primary update block by:
identifying one or more valid data regions of the primary update block,
selectively performing EPWR on the one or more valid data regions of the primary update block, and
in response to determining, based on a result of the EPWR performed on the one or more valid data regions, that the one or more valid data regions do not include an uncorrectable error, releasing the secondary update block,
wherein each valid data region of the one or more valid data regions is a data region of a predetermined size in the primary update block that includes at least one fragment of valid data.

* * * * *